US009666085B2

(12) United States Patent
Gannon et al.

(10) Patent No.: US 9,666,085 B2
(45) Date of Patent: May 30, 2017

(54) METHODS AND SYSTEMS FOR DISPLAYING A TAXI CLEARANCE

(71) Applicant: HONEYWELL INTERNATIONAL INC., Morristown, NJ (US)

(72) Inventors: Aaron Gannon, Anthem, AZ (US); Thea L. Feyereisen, Hudson, WI (US); Troy Nichols, Peoria, AZ (US); Jerry Ball, Peoria, AZ (US); Sean Caufield, Avondale, AZ (US); John G. Suddreth, Cave Creek, AZ (US); Ivan Sandy Wyatt, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 212 days.

(21) Appl. No.: 14/541,649

(22) Filed: Nov. 14, 2014

(65) Prior Publication Data
US 2016/0140855 A1 May 19, 2016

(51) Int. Cl.
*G08G 5/06* (2006.01)
*B60K 35/00* (2006.01)
*G08G 5/00* (2006.01)

(52) U.S. Cl.
CPC ............ *G08G 5/065* (2013.01); *B60K 35/00* (2013.01); *G08G 5/0021* (2013.01)

(58) Field of Classification Search
USPC ....................................................... 701/533
See application file for complete search history.

(56) References Cited

U.S. PATENT DOCUMENTS

| 5,844,503 | A | 12/1998 | Riley et al. |
| 6,085,147 | A | 7/2000 | Myers |
| 6,144,915 | A | 11/2000 | Shiomi et al. |
| 6,477,515 | B1 | 11/2002 | Boroujerdi et al. |
| 6,751,545 | B2 | 6/2004 | Walter |
| 6,862,519 | B2 | 3/2005 | Walter |
| 7,222,017 | B2 | 5/2007 | Clark et al. |
| 7,343,229 | B1 * | 3/2008 | Wilson ................. G08G 5/0021 340/951 |

(Continued)

FOREIGN PATENT DOCUMENTS

| EP | 2355070 A2 | 8/2011 |
| EP | 2584550 A2 | 4/2013 |

OTHER PUBLICATIONS

Extended EP Search Report for Application No. 15193766.1-1803/3023965 dated Jul. 1, 2016.

(Continued)

*Primary Examiner* — Shelley Chen
(74) *Attorney, Agent, or Firm* — Lorenz & Kopf, LLP

(57) ABSTRACT

Methods and systems are provided for displaying a taxi clearance for an aircraft at an airport. One exemplary method involves receiving user input indicative of a constraining taxi path of a plurality of taxi paths at the airport, determining a first taxi portion between an initial location for the taxi clearance and the constraining taxi path, determining a second taxi portion between the constraining taxi path and a destination location for the taxi clearance, and displaying, on a display device associated with the aircraft, a taxi route comprising the first taxi portion, the second taxi portion, and the constraining taxi path between the first taxi portion and the second taxi portion.

19 Claims, 8 Drawing Sheets

(56) References Cited

U.S. PATENT DOCUMENTS

| | | | |
|---|---|---|---|
| 7,343,299 B2 | 3/2008 | Algazi | |
| 7,630,829 B2 | 12/2009 | Pepitone | |
| 7,755,516 B2 | 7/2010 | Clark et al. | |
| 7,813,845 B2 | 10/2010 | Doose et al. | |
| 7,999,699 B2 | 8/2011 | Caillaud et al. | |
| 8,180,562 B2 | 5/2012 | Clark et al. | |
| 8,280,618 B2 | 10/2012 | Feyereisen et al. | |
| 8,386,167 B2 | 2/2013 | Clark et al. | |
| 8,428,872 B2 | 4/2013 | Clark et al. | |
| 8,548,720 B2 | 10/2013 | Shukla | |
| 8,731,811 B2 | 5/2014 | Bilek et al. | |
| 2003/0105579 A1 | 6/2003 | Walter | |
| 2004/0006412 A1 | 1/2004 | Doose et al. | |
| 2005/0283305 A1* | 12/2005 | Clark | G01C 23/00 |
| | | | 701/120 |
| 2007/0241935 A1 | 10/2007 | Pepitone et al. | |
| 2009/0051570 A1 | 2/2009 | Clark et al. | |
| 2009/0265089 A1 | 10/2009 | Gauffriau et al. | |
| 2009/0306887 A1 | 12/2009 | Clark et al. | |
| 2010/0017105 A1 | 1/2010 | Pepitone | |
| 2010/0125403 A1 | 5/2010 | Clark et al. | |
| 2010/0198489 A1 | 8/2010 | Rozovski et al. | |
| 2010/0324807 A1 | 12/2010 | Doose et al. | |
| 2011/0184635 A1 | 7/2011 | Khatwa et al. | |
| 2011/0196599 A1* | 8/2011 | Feyereisen | G01C 21/00 |
| | | | 701/120 |
| 2013/0103297 A1* | 4/2013 | Bilek | G08G 5/065 |
| | | | 701/120 |
| 2014/0303815 A1* | 10/2014 | Lafon | G01C 21/3446 |
| | | | 701/3 |

OTHER PUBLICATIONS

Zhen, L. et al.: "A Dynamic Model for Aircraft Route Optimizing in Airport Surface Management", 9th International Conference on Electronic Measurement & Instruments (ICEMI) Aug. 16-19, 2009, Beijing, China; Published: IEEE, Piscataway, NJ, Aug. 16, 2009, pp. 3-1068-3-1072, XP031537387, ISBN: 978-1-4244-3863-1.

Pschierer, C. et al.: "Standardization of Databases for AMDB Taxi Routing Functions", Proceedings of The SPIE, vol. 7689, Jan. 1, 2010, XP040535793, DOI: 10.1117/12.850112.

EP Search Report for Application No. 12 188 214.6 dated May 16, 2013.

EP Office Action for Application No. 12 188 214.6 dated May 29, 2013.

Young, S.D. et al.; Runway Incursion Prevention: A Technology Solution; National Aeronautics and Space Administration Langley Research Center Hampton, Virginia, USA;Presented at the Joint Meeting of the Flight Safety Foundation's 54th Annual International Air Safety Seminar, the International Federation of Airworthiness' 31st International Conference, and the International Air Transport Association Nov. 5-8, 2001 Athens, Greece.

* cited by examiner

METHODS AND SYSTEMS FOR DISPLAYING A TAXI CLEARANCE

TECHNICAL FIELD

The subject matter described herein relates generally to avionics systems, and more particularly, embodiments of the subject matter relate to displaying taxi clearances.

BACKGROUND

Taxi instructions, also referred to as a taxi clearance, provide a specific route (i.e., a sequence of taxiways, runways, or segments thereof) which an aircraft (or another vehicle) should follow when traversing between locations on the ground (e.g., between terminals, hangars and/or runways) to avoid confusion and/or runway incursions or to otherwise maintain safe and organized ground traffic flow. Taxi instructions are typically received by a pilot from an air traffic controller immediately prior to taxiing the aircraft, for example, from a terminal and/or hangar to a runway for departure, from a runway to a terminal and/or hangar after landing, or to otherwise taxi the aircraft clear of a runway.

Traditionally, after receiving taxi instructions at an airport, the pilot would manually record the taxi instructions (e.g., by writing them down on a piece of paper) and then utilize a paper chart corresponding to that airport to navigate the aircraft about the airport in accordance with the received taxi instructions. This undesirably increases a pilot's workload and distracts the pilot's focus and/or attention on operating the aircraft, and thus, degrades the pilot's situational awareness. Additionally, larger airports typically have a large number of taxiways, runways, terminals and/or hangars, potentially resulting in more complex taxi instructions, which in combination with an increasing amount of ground traffic (which also increases the likelihood of runway incursions), further increases the demand on a pilot. Modern electronic systems have been adapted to allow the pilot to input the taxi instructions for presentation on an onboard display device. However, many existing approaches often still require the pilot manually locate the proper keys, buttons, or other user interface elements and manually input the complete sequence of instructions received from the air traffic controller accurately, and thereby fail to appreciably reduce the pilot's workload.

BRIEF SUMMARY

An exemplary method is provided for displaying a taxi clearance for an aircraft. The method involves receiving user input indicative of a constraining taxi path of a plurality of taxi paths at the airport, determining a first taxi portion between an initial location for the taxi clearance and the constraining taxi path, determining a second taxi portion between the constraining taxi path and a destination location for the taxi clearance, and displaying, on a display device associated with the aircraft, a taxi route comprising the first taxi portion, the second taxi portion, and the constraining taxi path between the first taxi portion and the second taxi portion.

In another embodiment, a display system suitable for use with an aircraft is provided. The aircraft display system includes a user input device to receive an input indicative of a constraining taxi path of a plurality of taxi paths at an airport, a display device to display a map of the airport that includes the plurality of taxi paths at the airport, and a processing system coupled to the user input device and the display device. The processing system determines a first taxi portion between an initial location for a taxi clearance and the constraining taxi path, determines a second taxi portion between the constraining taxi path and a destination location for the taxi clearance, and updates the map to visually indicate the first taxi portion, the second taxi portion, and the constraining taxi path between the first taxi portion and the second taxi portion as the taxi clearance.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
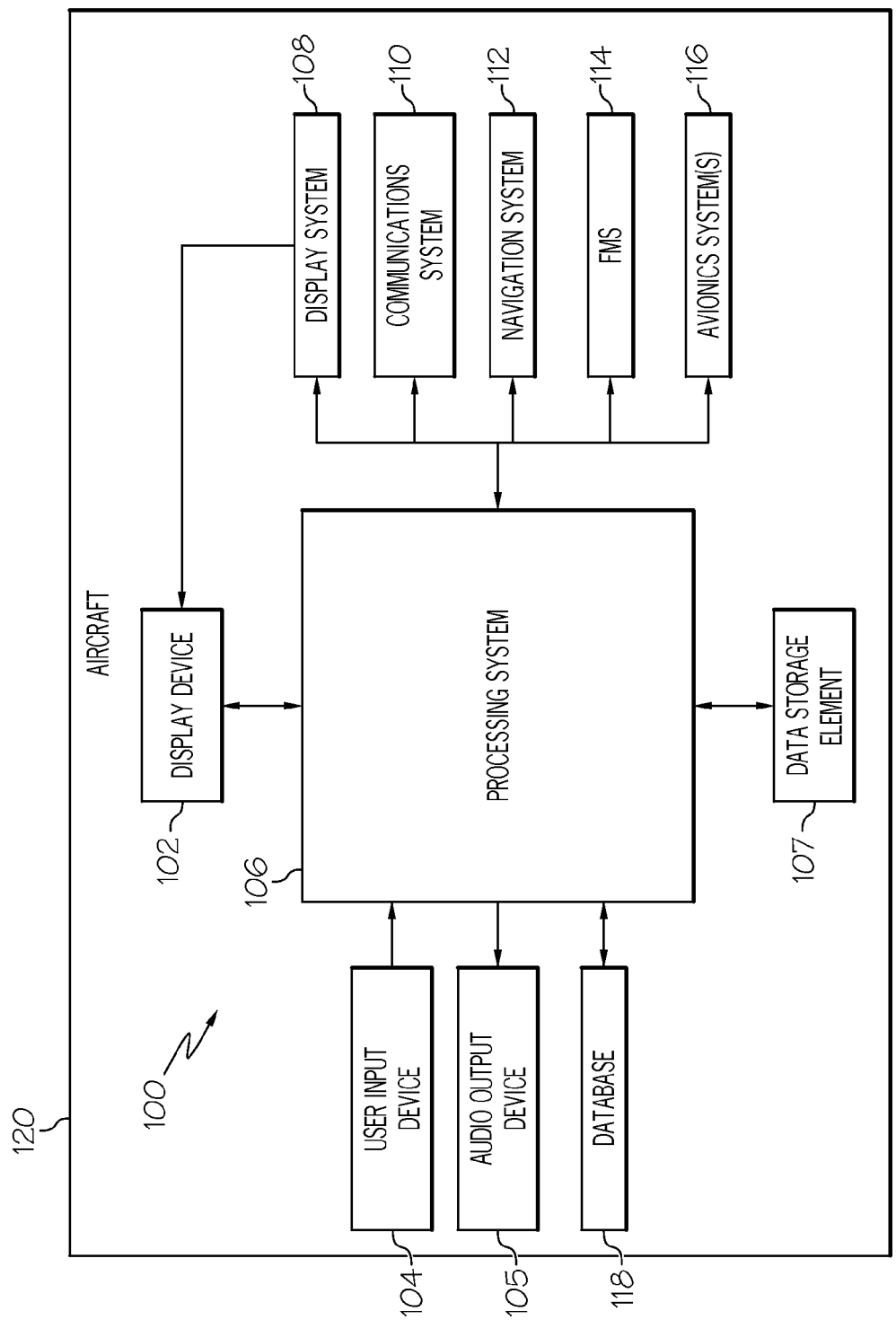
FIG. 1 is a block diagram of an exemplary display system suitable for use with an aircraft in one or more exemplary embodiments.

Embodiments of the subject matter described herein relate to systems and methods for displaying a taxi clearance for an aircraft. As used herein, a taxi clearance (or taxi instructions) should be understood as a sequence of taxi paths that define the route that the aircraft is instructed to or intended to follow when traversing (or taxiing) between an initial location on the ground and a destination location on the ground (e.g., between terminals, hangars and/or runways) to avoid confusion and/or runway incursions or to otherwise maintain safe and organized ground traffic flow. In this regard, the interconnecting portions of the sequential taxi paths form a continuous route or path from the initial location to the destination location. As used herein, a taxi path should be understood as a delineated path for travel on the ground, such as a taxiway, runway, or another navigational path on the ground.

In exemplary embodiments described herein, one or more user inputs indicative of constraining taxi paths for the taxi clearance are received and utilized to generate and display a taxi route representative of the taxi clearance. As described in greater detail below in the context of FIGS. 2-5, an initial taxi route between the initial location for the taxi clearance and the destination location for the taxi clearance may be automatically determined and displayed on an onboard display device using a visually distinguishable characteristic that indicates the initial taxi route was automatically determined (e.g., a color, line style, or the like). In this regard, initial taxi route is a subset of a plurality of taxi paths at the airport, where interconnected portions of the subset of taxi paths provide a continuous route that connects the initial location and the destination location, with the interconnected portions being rendered or otherwise displayed using the visually distinguishable characteristic.

In response to receiving a user input indicative of a constraining taxi path of the taxi paths at the airport, an updated taxi route is determined that utilizes the constraining taxi path. In this regard, a first taxi portion between the initial location for the taxi clearance and the constraining taxi path is automatically determined, and a second taxi portion between the constraining taxi path and the destination location for the taxi clearance, with a portion of the constraining taxi path providing the interconnection between the first taxi portion and the second taxi portion. The onboard display device is then automatically updated to display the updated taxi route in lieu of the initial taxi route, with the constraining taxi path being displayed using a different visually distinguishable characteristic than the remaining taxi portions of the updated taxi route. For example, the first taxi portion may be realized as a first subset of one or more taxi paths at the airport, where interconnecting portions of the first subset of taxi paths provide a continuous route that connects the initial location to the constraining taxi path, with the interconnecting portions of those taxi paths being rendered or otherwise displayed using the same visually distinguishable characteristic as the initial taxi route to indicate that the first taxi portion was automatically determined. Similarly, the second taxi portion may be realized as a second subset of one or more taxi paths at the airport, where interconnecting portions of the second subset of taxi paths provide a continuous route that connects the constraining taxi path to the destination location, with the interconnecting portions of those taxi paths being rendered or otherwise displayed using the same visually distinguishable characteristic as the first taxi portion to indicate the second taxi portion was also automatically determined. The portion of the constraining taxi path that interconnects the first taxi portion and the second taxi portion is then rendered or otherwise displayed using a different visually distinguishable characteristic to indicate that portion of the displayed taxi clearance was manually constrained to that taxi path. In this manner, the constraining taxi path is used to manually adjust the displayed taxi clearance until the displayed taxi clearance represents the taxi clearance that was received for the aircraft from an air traffic controller or the like.

As described in greater detail below, additional user inputs indicative of additional constraining paths may be received and the displayed taxi clearance dynamically updated in response to each constraining taxi path until the displayed taxi clearance matches the received taxi clearance, at which point the pilot or other aircraft operator may cease inputting constraints for the taxi clearance. Thus, the pilot workload associated with inputting a received taxi clearance for display may be reduced, thereby improving the pilot's ability to maintain situational awareness with respect to taxiing and/or operating the aircraft.

FIG. 1 depicts an exemplary embodiment of a display system 100 which may be utilized with a vehicle, such as an aircraft 120. In an exemplary embodiment, the display system 100 includes, without limitation, a display device 102, a user input device 104, an audio output device 105, a processing system 106, a display system 108, a communications system 110, a navigation system 112, a flight management system (FMS) 114, one or more avionics systems 116, and a data storage element 118 suitably configured to support operation of the display system 100, as described in greater detail below.

In exemplary embodiments, the display device 102 is realized as an electronic display capable of graphically displaying flight information or other data associated with operation of the aircraft 120 under control of the display system 108 and/or processing system 106. In the illustrated embodiment of FIG. 1, the display device 102 is coupled to the display system 108 and the processing system 106, with the processing system 106 and the display system 108 being cooperatively configured to display, render, or otherwise convey one or more graphical representations or images associated with operation of the aircraft 120 on the display device 102, as described in greater detail below.

The user input device 104 is coupled to the processing system 106, and the user input device 104 and the processing system 106 are cooperatively configured to allow a user (e.g., a pilot, co-pilot, or crew member) to interact with the display device 102 and/or other elements of the display system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the display system 100 in a "hands free" manner without requiring the user to move his or her hands, eyes and/or head to interact with the display system 100. The audio output device 105 is coupled to the processing system 106, and the audio output device 105 and the processing system 106 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art.

The processing system 106 generally represents the hardware, circuitry, processing logic, and/or other components configured to facilitate communications and/or interaction between the elements of the display system 100 and perform additional processes, tasks and/or functions to support operation of the display system 100, as described in greater detail below. Depending on the embodiment, the processing system 106 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 106 includes processing logic that may be configured to carry out the functions, techniques, and processing tasks associated with the operation of the display system 100 described in greater detail below. Furthermore, the steps of a method or algorithm described in connection with the embodiments disclosed herein may be embodied directly in hardware, in firmware, in a software module executed by the processing system 106, or in any practical combination thereof. In accordance with one or more embodiments, the processing system 106 includes or otherwise accesses a data storage element 107, such as a memory or another suitable non-transitory short or long term storage media capable of storing computer-executable programming instructions or other data for execution that, when read and executed by the processing system 106, cause the processing system 106 to execute and perform one or more of the processes, tasks, operations, and/or functions described herein. In some embodiments, when the user input device 104 is realized as an audio input device, the processing system 106 may implement a speech recognition engine (or voice recognition engine) and/or speech-to-text system adapted to receive audio input from a user. The processing system 106 may also include various filters, analog-to-digital converters (ADCs), digital-to-analog converters (DACs), speech synthesizers, and the like, which are suitably configured to support operations of the display system 100 (e.g., receiving auditory input from the user input device 104 or providing auditory feedback via the audio output device 105).

The display system 108 generally represents the hardware, circuitry, processing logic, and/or other components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

As described in greater detail below, in an exemplary embodiment, the processing system 106 includes or otherwise accesses a data storage element 118 (or database), which maintains information regarding the taxi paths for one or more airports or other ground locations. In an exemplary embodiment, each airport is associated with a plurality of taxi paths for traveling between the hangars, terminals, aprons, ramp areas, parking stands, de-icing stands, fixed-base operators (FBOs) and/or runways at the respective airport. In this regard, the data storage element 118 maintains an association between a respective airport and the taxi paths located at that respective airport. In an exemplary embodiment, the data storage element 118 maintains geographic information pertaining to the taxi paths at the respective airport, such as, for example, the geographic location of the endpoints of the taxiways and/or runways, alphanumeric identifiers for the respective taxiways and/or runways, identification of the taxiways and/or runways that intersect, cross or otherwise connect to another taxiway and/or runway, the geographic location of the intersections of taxiways and/or runways, or other information relating to the relationship between a respective taxiway and/or runway and the other taxiways and/or runways at the airport. The data storage element 118 also maintains one or more attributes associated with each of the taxi paths, such as, for example, the type of taxi path (e.g., runway or taxiway), the width of the taxi path, the weight limit for the taxi path (e.g., the maximum allowable weight for taxiing aircraft on the taxi path), the type of surface of the taxi path (e.g., concrete, asphalt, or the like), and the like. Additionally, as described in greater detail below, in accordance with one or more embodiments, the data storage element 118 also maintains status information for the taxi paths (or portions thereof) at the airport indicating whether or not a respective taxi path (or portion thereof) is currently operational along with directional information for the taxi paths (or portions thereof).

Depending on the embodiment, the data storage element 118 may be physically realized using RAM memory, ROM memory, flash memory, registers, a hard disk, or another suitable data storage medium known in the art or any suitable combination thereof. In an exemplary embodiment, the processing system 106, the display system 108, and/or the FMS 114 are cooperatively configured to render and/or display, on the display device 102, a navigational map of an airport (alternatively referred to herein as an airport map) that includes a graphical representation of the taxi paths at that airport utilizing the taxi path information maintained by the data storage element 118 for that particular airport. In an exemplary embodiment, the processing system 106 is configured to display or otherwise graphically indicate, on the airport map displayed on the display device 102, a taxi clearance for the aircraft 120 based on an input taxi clearance received by the processing system 106 (e.g., via user input device 104).

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. In an exemplary embodiment, the avionics system 116 includes an automated system adapted to provide auditory guidance and/or warnings to a user via audio output device 105 when taxiing, as described in greater detail below. It should be noted that although FIG. 1 depicts a single avionics system 116, in practice, the display system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the display system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the display system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the display system 100 (e.g., via a data link and/or communications system 110). In this regard, in some embodiments, the display device 102, the user input device 104, the audio output device 105, and/or the processing system 106 may be implemented as an electronic flight bag that is separate from the aircraft 120 but capable of being communicatively coupled to the other elements of the display system 100 when onboard the aircraft 120. Similarly, in some embodiments, the data storage element 118 may be located outside the aircraft 120 and communicatively coupled to the processing system 106 via a data link and/or communications system 110. Furthermore, practical embodiments of the display system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the display system 108 or the FMS 114. In other words, some embodiments may integrate the processing system 106 with the display system 108 or the FMS 114, that is, the processing system 106 may be a component of the display system 108 and/or the FMS 114.

Figure 2:
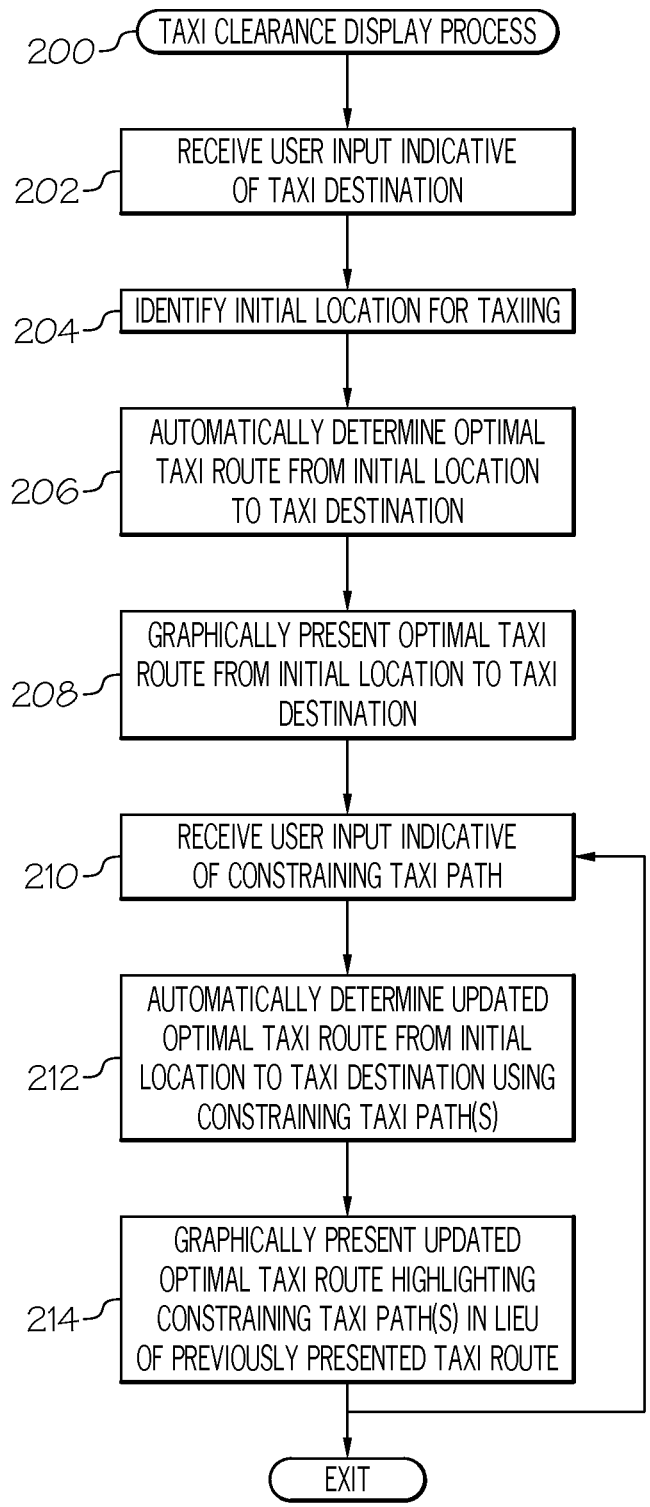
FIG. 2 is a flow diagram of an exemplary taxi clearance display process suitable for use with the system of FIG. 1 in accordance with one or more embodiments.

Referring now to FIG. 2, in an exemplary embodiment, the display system 100 is configured to perform a taxi clearance display process 200 and additional tasks, functions, and operations described below. The various tasks performed in connection with the illustrated process 200 may be performed by hardware, firmware, software executed by processing circuitry, or any combination thereof. For illustrative purposes, the following description may refer to elements mentioned above in connection with FIG. 1. In practice, portions of the taxi clearance display process 200 may be performed by different elements of the display system 100, such as, the display device 102, the user input device 104, the audio output device 105, the processing system 106, the display system 108, the communications system 110, the navigation system 112, the FMS 114, and/or the avionics system 116. It should be appreciated that the taxi clearance display process 200 may include any number of additional or alternative tasks, the tasks need not be performed in the illustrated order and/or the tasks may be performed concurrently, and/or the taxi clearance display process 200 may be incorporated into a more comprehensive procedure or process having additional functionality not described in detail herein. Moreover, one or more of the tasks shown and described in the context of FIG. 2 could be omitted from a practical embodiment of the taxi clearance display process 200 as long as the intended overall functionality remains intact.

Still referring to FIG. 2, and with continued reference to FIG. 1, in an exemplary embodiment, the taxi clearance display process 200 begins by receiving or otherwise obtaining a user input indicative of a destination location for a taxi clearance, identifying or otherwise obtaining an initial location for the taxi clearance, and automatically determining an initial taxi route from the initial location to the destination location (tasks 202, 204, 206). After determining the initial taxi route, the taxi clearance display process 200 automatically displays or otherwise graphically presents the initial taxi route on a display device as a taxi clearance for the aircraft between the initial location and the destination location (task 208). In this regard, the displayed initial taxi route represents a sequence of taxi paths that is suggested, recommended, or otherwise identified by the processing system 106 as being a likely taxi clearance for the aircraft from the initial location to the destination location.

In practice, an assigned taxi clearance (or taxi instructions) for the aircraft 120 may be provided to the pilot or other aircraft operator by an air traffic controller or other ground personnel (e.g., via the communications system 110 and the audio output device 105 and/or display device 102). In some embodiments, the taxi clearance received from the air traffic controller may begin with the destination location, such as a destination gate, terminal, hangar, FBO, or the like. In response to receiving the taxi clearance, the pilot, co-pilot or other onboard personnel utilizes the user input device 104 to manually input or otherwise provide the destination location for the received taxi clearance to the processing system 106. For example, the pilot may manipulate the user input device 104 (e.g., a knob or cursor control device) to input, select, or otherwise indicate the destination location for the taxi clearance. In one or more embodiments, the processing system 106 identifies the initial location for the taxi clearance as the current location of the aircraft 120 obtained from the navigation system 112, the FMS 114 and/or another avionics system 116. In yet other embodiments, the processing system 106 may identify the initial location for the taxi clearance based on a flight plan for the aircraft 120 (e.g., the designated runway for landing in the flight plan maintained by the FMS 114) or in response to a user manipulating the user input device 104 to identify the runway for landing.

In exemplary embodiments, in response to obtaining the destination location for the taxi clearance, the processing system 106 automatically determines an initial taxi route from the initial location to the destination location. In one or more embodiments, the processing system 106 analyzes the various possible combinations of taxi paths at the airport that may be utilized to taxi from the initial location to the destination location and selects or otherwise identifies an optimal combination of taxi paths using a desired taxiing optimization algorithm. For example, as described in U.S. Pat. No. 8,731,811, which is hereby incorporated by reference, the processing system 106 may access the taxi path information associated with the airport and maintained by the data storage element 118, and utilize the taxi path information to construct a graph data structure that is representative of the taxi paths at the airport. In this regard, each geographic location where two or more taxi paths intersect corresponds to a node of the graph while the portions (or segments) of the taxi paths between two different intersection locations (or nodes) become an edge of the graph. The nodes and edges of the graph may be associated with the alphanumeric identifier(s) of their associated taxi path(s) along with other criteria for weighting the length of the edges. Using the initial taxi location as a starting node (e.g., the current location of the aircraft 120 or the node closest to the current location of the aircraft 120) and the destination taxi location as a destination node (e.g., the node associated with the destination location), the processing system 106 determines the different possible taxi routes between the starting and destination nodes utilizing the oriented graph data structure, with each unique combination of nodes and edges of the graph that provides a route between the starting node and the destination node being identified by the processing system 106 as a possible taxi route. In this regard, each possible taxi route includes a subset of the taxi paths at the airport arranged in a sequence that provides a continuous route that from the initial location to the destination location that is different from the other possible taxi routes.

Thereafter, the processing system 106 identifies or otherwise determines the optimal taxi route from among the plurality of possible taxi routes based on one or more different criteria (e.g., the current heading of the aircraft 120, the total distance traveled, the number of runway crossings, historical taxiway usage data, and the like) used to filter or otherwise eliminate possible taxi routes from consideration until arriving at a single taxi route, which represents the optimal taxi route based on the criteria used to filter the possible taxi routes. In yet other embodiments, the processing system 106 may automatically determine the initial taxi route from the initial location to the destination location based on historical usage data for the airport (e.g., maintained in the data storage element 107) indicative of the most frequently used taxi clearance between the starting node and the destination node. It should be appreciated that there are numerous different criteria and techniques that may be utilized to identify an optimal taxi route between an initial taxi location and a destination taxi location, and the subject matter is not intended to be limited to any particular manner for identifying the initial taxi route between the initial taxi location and the destination taxi location.

In response to determining an initial taxi route from the initial location to the destination location, the processing system 106 automatically displays or otherwise presents a graphical representation of that initial taxi route on the display device 102. In this regard, the processing system 106 renders, highlights, or otherwise visually indicates the taxi paths (or portions thereof) of the initial taxi route in a manner that distinguishes them from portions of those taxi paths and/or other taxi paths at the airport that are not part of the initial taxi route. For example, the processing system 106 may render the interconnecting portions (or segments) of the taxi paths of the initial taxi route that provide a continuous route from the initial location to the destination location using a visually distinguishable characteristic. The visually distinguishing characteristic may include one or more of a visually distinguishable color, hue, tint, brightness, graphically depicted texture or pattern, contrast, transparency, opacity, shading, animation, line type, and/or other graphical effect that highlight the portions of the taxi paths of the initial taxi route as the taxi clearance that the aircraft 120 is intended to travel.

Figure 3:
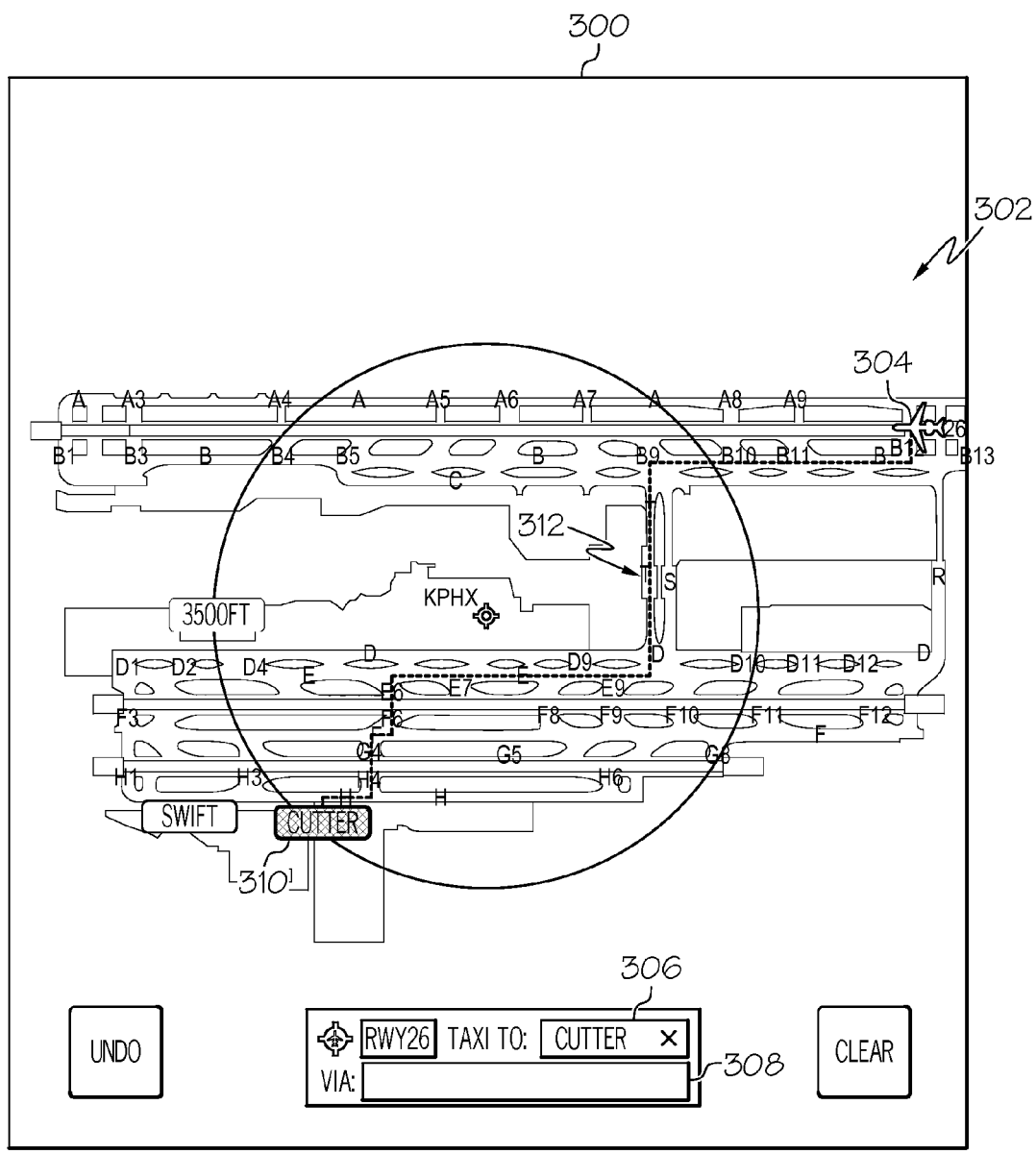
FIGS. 3-5 depict a sequence of navigational taxi map displays suitable for display on a display device onboard the aircraft in the system of FIG. 1 in accordance with one or more embodiments of the taxi clearance display process of FIG. 2.

FIG. 3 depicts an airport map display 300 comprising a graphical representation of an airport 302 that may be presented on the display device 102 onboard the aircraft 120 in conjunction with the taxi clearance display process 200 of FIG. 2. The graphical representation of the airport 302 illustrates the layout of the plurality of taxi paths at the airport. In the illustrated embodiment, the aircraft 120 is located at the airport 302, and a graphical representation 304 of the aircraft 120 is depicted on the airport map 300 overlying the graphical representation of the airport 302 at a location corresponding to the current location of the aircraft 120.

In the illustrated embodiment, the processing system 106 renders or otherwise displays, on the airport map display 300, a graphical user interface (GUI) element 306, such as a text box, for receiving the destination for the taxi clearance. The pilot or other onboard personnel may manipulate the user input device 104 to select the text box 306 and input the name or identifier for the destination location for the taxi clearance. In this regard, FIG. 3 depicts a user input indicating the FBO named "CUTTER" as the destination location for the taxi clearance. In response to receiving the user input identifying CUTTER as the destination location, the processing system 106 renders or otherwise displays the graphical representation of the CUTTER FBO 310 in a visually distinguishable characteristic to visually indicate it is the destination location for the taxi clearance. For example, the graphical representation of the CUTTER FBO 310 may be rendered in magenta or some other color to visually indicate that it corresponds to a manually input (or manually identified) taxi destination location. Additionally, the processing system 106 identifies the current location of the aircraft 304 as being on runway 26R and between the node corresponding to the intersection of runway 26R and taxiway B12 and the node corresponding to the intersection of runway 26R and taxiway B13.

As described above, in response to identifying CUTTER as the destination location, the processing system 106 analyzes the various possible combinations of taxi paths at the airport 302 that may be utilized to taxi from the initial location (e.g., the current location of the aircraft 120, 304 on runway 26R) to the destination node corresponding to CUTTER. In this regard, FIG. 3 depicts the airport map display 300 after the processing system 106 selects or otherwise identifies the sequence of taxiways B12-B-T-E-E6-F6-F-G4-H4-H as the optimal taxi route between the current location of the aircraft 120, 304 and the CUTTER FBO 310. In response to identifying the initial taxi route, the processing system 106 displays a graphical representation of the initial taxi route 412 by displaying or otherwise rendering the interconnected portions (or segments) of the B12, B, T, E, E6, F6, F, G4, H4, and H taxiways using a visually distinguishable characteristic, such as a dashed cyan line. In this manner, the processing system 106 highlights the taxi paths of the initial taxi route 412 as the taxi clearance for the aircraft 120.

Referring again to FIG. 2, the taxi clearance display process 200 continues by receiving or otherwise obtaining a user input indicative of a constraining taxi path, automatically determining an updated taxi route from the initial location to the destination location that utilizes the constraining taxi path, and updating the display device to display or otherwise graphically present the updated taxi route (tasks 210, 212, 214). In this regard, the constraining taxi path modifies or otherwise adjusts the taxi route that is automatically determined and displayed by the processing system 106 to confirm to the actual taxi clearance received from the air traffic controller. For example, the sequence of taxi paths in the actual taxi clearance may be different from the sequence of taxi paths of the initial taxi route, such that the pilot or other onboard personnel would like to modify the taxi clearance presented on the display device 102 by providing a constraining taxi path to constrain or otherwise restrict the displayed taxi clearance to using a particular taxi path that was part of the taxi clearance received from the air traffic controller.

In response to receiving user input indicative of a first constraining taxi path, the processing system 106 automatically determines a first taxi portion from the initial location for the taxi clearance to the constraining taxi path in a similar manner as described above. For example, the processing system 106 may identify various possible combinations of taxi paths from the initial location to the constraining taxi path and analyze those possible combinations to identify an optimal sequence of one or more taxi paths that provide a continuous route from the initial location to the constraining taxi path. In this regard, the first taxi portion connects the initial location and the constraining taxi path. In some embodiments, the first taxi portion from the initial location for the taxi clearance to the constraining taxi path may be substantially identical to the initial portion of the initial taxi route.

In a similar manner, the processing system 106 also automatically determines a second taxi portion that provides a continuous route from the constraining taxi path to the destination location for the taxi clearance. Thus, the second taxi portion connects the constraining taxi path to the destination location. For example, the processing system 106 may identify various possible combinations of taxi paths from the constraining taxi path to the destination location and analyze those possible combinations to identify an optimal sequence of one or more taxi paths from the constraining taxi path to the destination location. Thereafter, the processing system 106 identifies the sequence of the first taxi portion, the constraining taxi path, and the second taxi portion as the updated taxi route and displays or otherwise presents the updated taxi route on the display device 102 in lieu of the initial taxi route. In exemplary embodiments, the constraining taxi path portion of the updated taxi route is rendered using a visually distinguishable characteristic that is different from the remaining portions of the updated taxi route to highlight or otherwise visually indicate that taxi path was manually input or otherwise identified.

Figure 4:
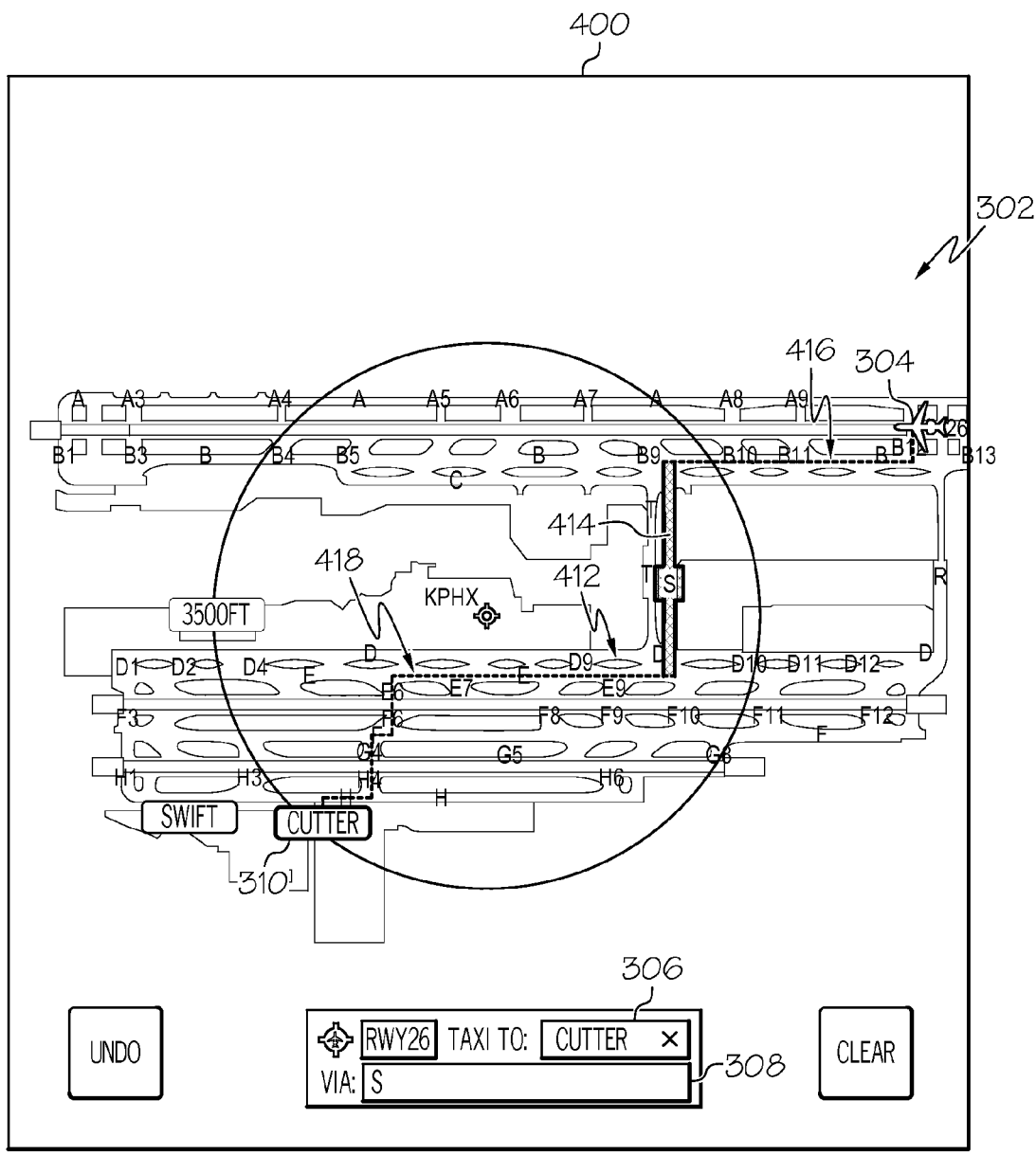

Referring now to FIGS. 3-4, in the illustrated embodiment, the processing system 106 renders or otherwise displays, on the airport map display 300, another GUI element 308, such as another text box, for receiving constraining taxi paths for the displayed taxi clearance. The pilot or other onboard personnel may manipulate the user input device 104 to select the text box 308 and input the name or identifier for the taxi path for which the user would like the displayed taxi clearance to be constrained. In this regard, FIG. 4 depicts a user input indicating taxiway S as a constraining taxi path for the taxi clearance.

In response to receiving the user input identifying taxiway S as a constraining taxi path, the processing system 106 analyzes the various possible combinations of taxi paths at the airport 302 that may be utilized to taxi from the initial location (e.g., the current location of the aircraft 120, 304 on runway 26R) to an intermediate destination node corresponding to an intersection with the constraining taxi path. In this regard, FIG. 4 depicts the updated airport map display 400 after the processing system 106 selects or otherwise identifies the sequence of taxiways B12-B as the optimal taxi route portion 416 from between the current location of the aircraft 120, 304 and the node where taxiway B intersects constraining taxiway S.

Additionally, the processing system 106 analyzes the various possible combinations of taxi paths at the airport 302 that may be utilized to taxi from the constraining taxi path to the destination location for the taxi clearance. In this regard, the processing system 106 identifies the various possible taxi routes to the destination location from a node along the constraining taxi path that is different from the node where the first optimal taxi route portion intersects the constraining taxi path to ensure the constraining taxi path is utilized as part of the taxi clearance. FIG. 4 depicts the updated airport map display 400 after the processing system 106 selects or otherwise identifies the sequence of taxiways E-E6-F6-F-G4-H4-H as the optimal taxi route portion 418 from a node along the constraining taxiway S other than where taxiways B and S intersect and the destination node corresponding to the CUTTER FBO 310.

After identifying the updated taxi route that includes a first optimal taxi route portion from the starting location for the taxi clearance to the constraining taxi path, followed by the constraining taxi path, followed by a second optimal taxi route portion from the constraining taxi path to the destination location for the taxi clearance, the processing system 106 automatically displays a graphical representation of the updated taxi route 412 in lieu of the initial taxi route 312. As illustrated in FIG. 4, in exemplary embodiments, the processing system 106 displays or otherwise renders the interconnected portions (or segments) of the taxi paths of the optimal taxi route portions 416, 418 identified by the processing system 106 using the same visually distinguishable characteristic as the initial taxi route 312. In this regard, FIG. 4 depicts the processing system 106 rendering the appropriate portions of the B12, B, E, E6, F6, F, G4, H4, and H taxiways using a dashed cyan line.

To visually indicate or distinguish the constraining taxi path from the automatically identified taxi paths of the taxi clearance, the processing system 106 displays or otherwise renders the graphical representation of the interconnecting portion (or segment) of the constraining taxi path using one or more visually distinguishable characteristic(s) that are different from the visually distinguishable characteristic(s) used to render the remaining portions of the taxi clearance. In this regard, FIG. 4 depicts the processing system 106 rendering the graphical representation of the portion 414 of constraining taxiway S between its intersection with taxiway B and its intersection with taxiway E using a solid magenta line that provides an interconnection between the dashed cyan lines corresponding to the automatically identified portions 416, 418 of the displayed taxi clearance. Additionally, the processing system 106 may render the name or identifier for the constraining taxi path using one or more visually distinguishable characteristic(s) that are also used for the associated graphical representation 414 (e.g., by highlighting the identifier 'S' using the same color used to render the constraining portion 414). Thus, the pilot or other user viewing the updated airport map display 400 may readily distinguish the manually-identified constraining portions of the displayed taxi clearance from the remaining automatically-identified portions of the displayed taxi clearance. It should be noted that the color or another visually distinguishable characteristic used for rendering the portion 414 of the manually input constraining taxi path may be identical to that color or visually distinguishable characteristic used for rendering the graphical representation of the CUTTER FBO 310 to visually correlate manually input components of the displayed taxi clearance.

Figure 5:
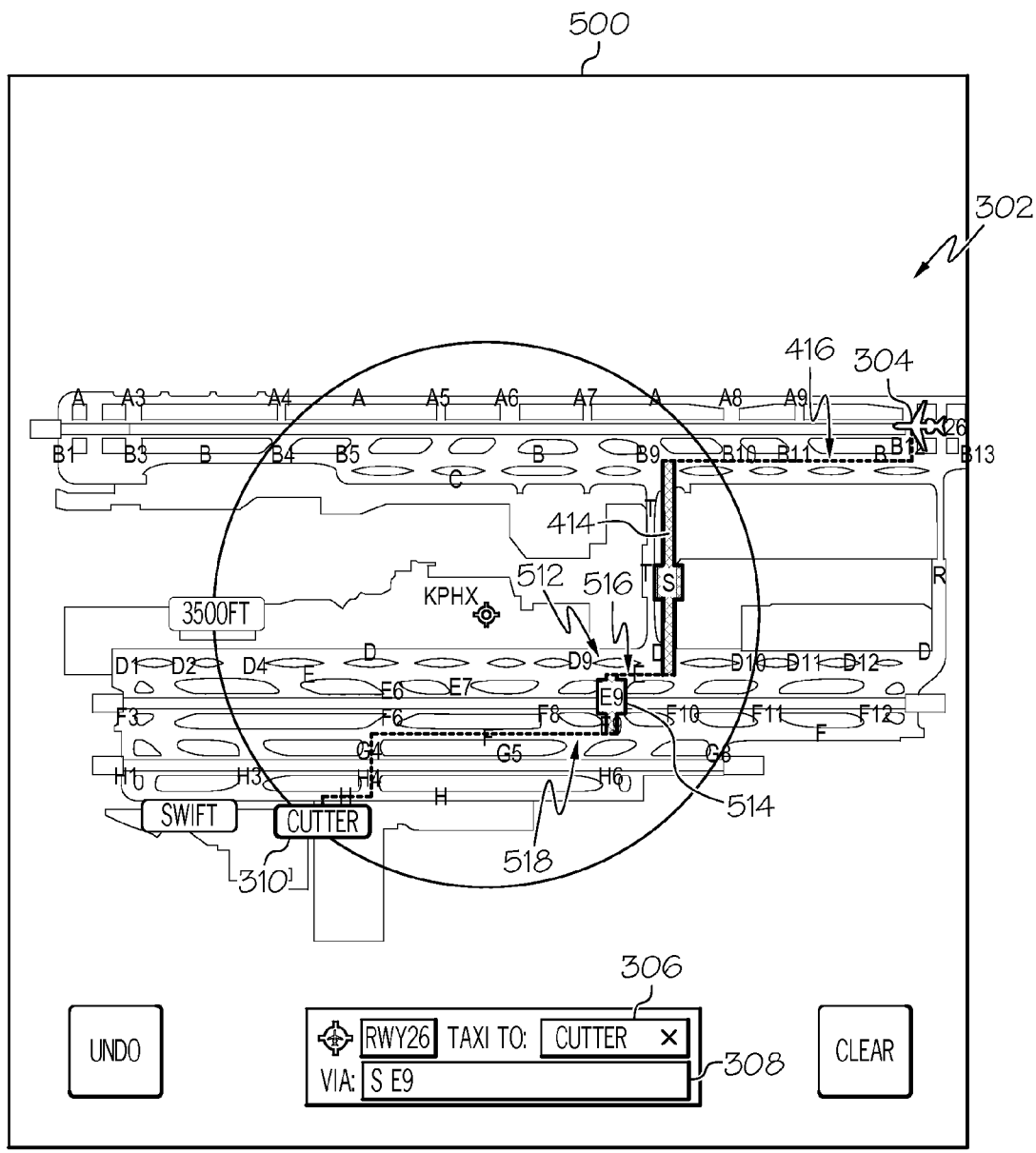

Referring again to FIG. 2 and with reference to FIGS. 4-5, in exemplary embodiments, the loop defined by tasks 210, 212 and 214 of the taxi clearance display process 200 may be repeated until the displayed taxi clearance matches the taxi clearance received from the air traffic controller. In this regard, the pilot or other onboard personnel may continue to input additional constraining taxi paths only until the displayed taxi clearance matches the received taxi clearance. In response to receiving user input indicative of a second constraining taxi path, the processing system 106 automatically determines a third taxi portion from the first constraining taxi path for the taxi clearance to the second constraining taxi path and automatically determines a fourth taxi portion from the second constraining taxi path to the destination location for the taxi clearance in a manner that ensures both the first constraining taxi path and the second constraining taxi path are utilized. Thereafter, the processing system 106 identifies the sequence of the first taxi portion from the starting location of the taxi clearance to the first constraining taxi path, the first constraining taxi path, the third taxi portion from the first constraining taxi path to the second constraining taxi path, the second constraining taxi path, and the fourth taxi portion from the second constraining taxi path to the destination location as the second updated taxi route and displays or otherwise presents the second updated taxi route on the display device 102 in lieu of the previously displayed taxi route.

For example, the processing system 106 may identify various possible combinations of taxi paths from a node or location on the first constraining taxi path to another node or location on the second constraining taxi path and analyze those possible combinations to identify an optimal sequence of one or more taxi paths from the first constraining taxi path to the second constraining taxi path. In a similar manner, the processing system 106 also automatically determines the fourth taxi portion from the second constraining taxi path to the destination location for the taxi clearance, for example, by identifying various possible combinations of taxi paths from the second constraining taxi path to the destination location and analyze those possible combinations to identify an optimal sequence of one or more taxi paths from the second constraining taxi path to the destination location.

FIG. 5 depicts a user input indicating taxiway E9 as a second constraining taxi path for the taxi clearance. In response to receiving the user input identifying taxiway E9 as a second constraining taxi path, the processing system 106 analyzes the various possible combinations of taxi paths at the airport 302 that may be utilized to taxi from the first constraining taxi path to an intermediate destination node corresponding to an intersection with the second constraining taxi path. In a similar manner as described above, the processing system 106 identifies the various possible taxi routes to constraining taxiway E9 from a node along the first constraining taxiway S other than where taxiways B and S intersect to ensure taxiway S is traversed or utilized as part of the taxi clearance. FIG. 5 depicts the updated airport map display 500 after the processing system 106 selects or otherwise identifies taxiway E as the optimal taxi route portion 516 from constraining taxiway S to an intermediate destination node along the second constraining taxiway E9.

Additionally, the processing system 106 analyzes the various possible combinations of taxi paths at the airport 302 that may be utilized to taxi from the second constraining taxi path to the destination location for the taxi clearance. Thus, the processing system 106 also identifies the various possible taxi routes to the destination location from a node along the second constraining taxi path that is different from the node where the second constraining taxi path intersects the third optimal taxi route portion to ensure the second constraining taxi path. In this regard, FIG. 5 depicts the updated airport map display 500 after the processing system 106 selects or otherwise identifies the sequence of taxiways F9-F-G4-H4-H as the optimal taxi route portion 518 from a node along the second constraining taxiway E9 other than where taxiways E and E9 intersect and the destination node corresponding to the CUTTER FBO 310. Thereafter, the processing system 106 identifies the sequence of the first optimal taxi route portion 416, the first constraining taxi path 414, the third optimal taxi route portion 516, the second constraining taxi path 514, and the fourth optimal taxi route portion 518 as the updated taxi route 512 and automatically displays or otherwise presents the updated taxi route 512 on the display device 102 in lieu of the previously-displayed taxi route 412.

As described above, in the illustrated embodiment of FIG. 5, the constraining taxi path portions 414, 514 of the updated taxi route 512 are rendered using a visually distinguishable characteristic that is different from the automatically-identified portions 416, 516, 518 of the updated taxi route 512 to visually distinguish the taxi paths 414, 514 of the displayed taxi clearance that were manually input from the taxi paths 416, 516, 518 of the displayed taxi clearance that were automatically identified. Thus, in FIG. 5, the processing system 106 renders the interconnected portions (or segments) of the taxi paths of the optimal taxi route portions 416, 516, 518 (portions of the B12, B, E, F9, F, F, G4, H4, and H taxiways) using a dashed cyan line while rendering the interconnecting portion 414 of constraining taxiway S between the optimal taxi route portions 416, 516 using a solid magenta line and rendering the interconnecting portion 514 of constraining taxiway E9 between the optimal taxi route portions 516, 518 using a solid magenta line. Thus, the pilot or other user viewing the updated airport map display 500 may readily distinguish the manually-identified constraining portions 414, 514 of the displayed taxi clearance from the remaining automatically-identified portions 416, 516, 518 of the displayed taxi clearance.

Referring to FIGS. 3-5, it will be appreciated that the taxi clearance display process 200 simplifies and/or reduces the workload on the pilot entering a taxi clearance received from an air traffic controller for display on an onboard display device 102. In this regard, the pilot may only input a few selected taxi paths of the received taxi clearance to achieve a displayed taxi clearance that matches the received taxi clearance. For example, if the received taxi clearance from the air traffic controller is "taxi to CUTTER via B12 B S E E9 F9 F G4 H4 H," the pilot need only manually input two taxiways (e.g., 'S' and 'E9') of the ten total taxiways of the completed taxi clearance to achieve the displayed taxi clearance of B12-B-S-E-E9-F9-F-G4-H4-H depicted in FIG. 5. In other words, the taxi clearance display process 200 may reduce the number of manual pilot inputs for entering the received taxi clearance by as much as eighty percent or more, depending on the particular taxi clearance and the effectiveness of the algorithms used to identify optimal taxi routes. Additionally, the order of manual inputs may correspond to the received taxi clearance (e.g., destination first).

As described above, the airport map display on the display device 102 is dynamically updated automatically in response to each incremental manual input, thereby allowing the pilot to quickly determine whether any additional inputs are required to achieve a displayed taxi clearance matching the received taxi clearance, which reduces the likelihood of the pilot making any additional unnecessary inputs. For example, when the pilot views the initial airport map display 300 and recognizes that the initially displayed taxi clearance 312 does not include taxiway S from the received taxi clearance, the pilot may manipulate the user input device 104 to input 'S' into the text box 308. In response to receiving the user input identifying taxiway S as a constraint, the display device 102 is updated automatically and/or substantially instantaneously from airport map display 300 to airport map display 400. Thereafter, when the pilot views the updated airport map display 400 and recognizes that the updated displayed taxi clearance 412 does not include taxiway E9 from the received taxi clearance, the pilot may manipulate the user input device 104 to input 'E9' into the text box 308. In response to receiving the user input identifying taxiway E9 as a constraint, the display device 102 is updated automatically and/or substantially instantaneously from airport map display 400 to airport map display 500. Thereafter, when the pilot views the updated airport map display 500 and recognizes that the updated displayed taxi clearance 512 matches the received taxi clearance, the pilot knows he or she can cease entering taxi constraints and resume focus on operating the aircraft 120 (e.g., by using the updated airport map display 500 to taxi from the current aircraft location 304 to the CUTTER FBO 310 via the received taxi clearance). In this manner, the pilot's situational awareness may be improved by reducing the workload associated with inputting the received taxi clearance for display.

Figure 6:
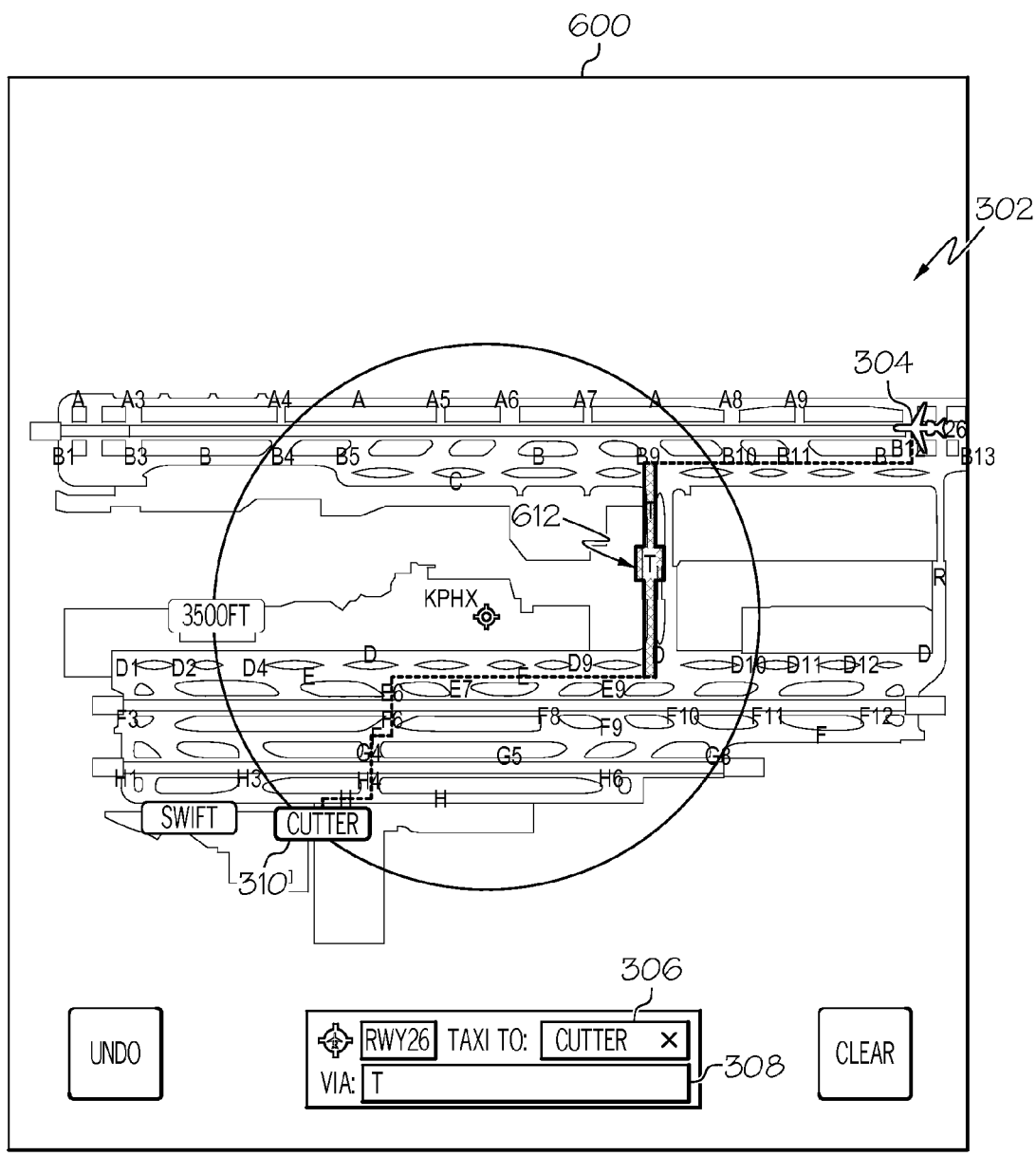
FIGS. 6-7 depict another sequence of navigational taxi map displays suitable for display on a display device onboard the aircraft in the system of FIG. 1 in accordance with one or more embodiments of the taxi clearance display process of FIG. 2.
Figure 7:
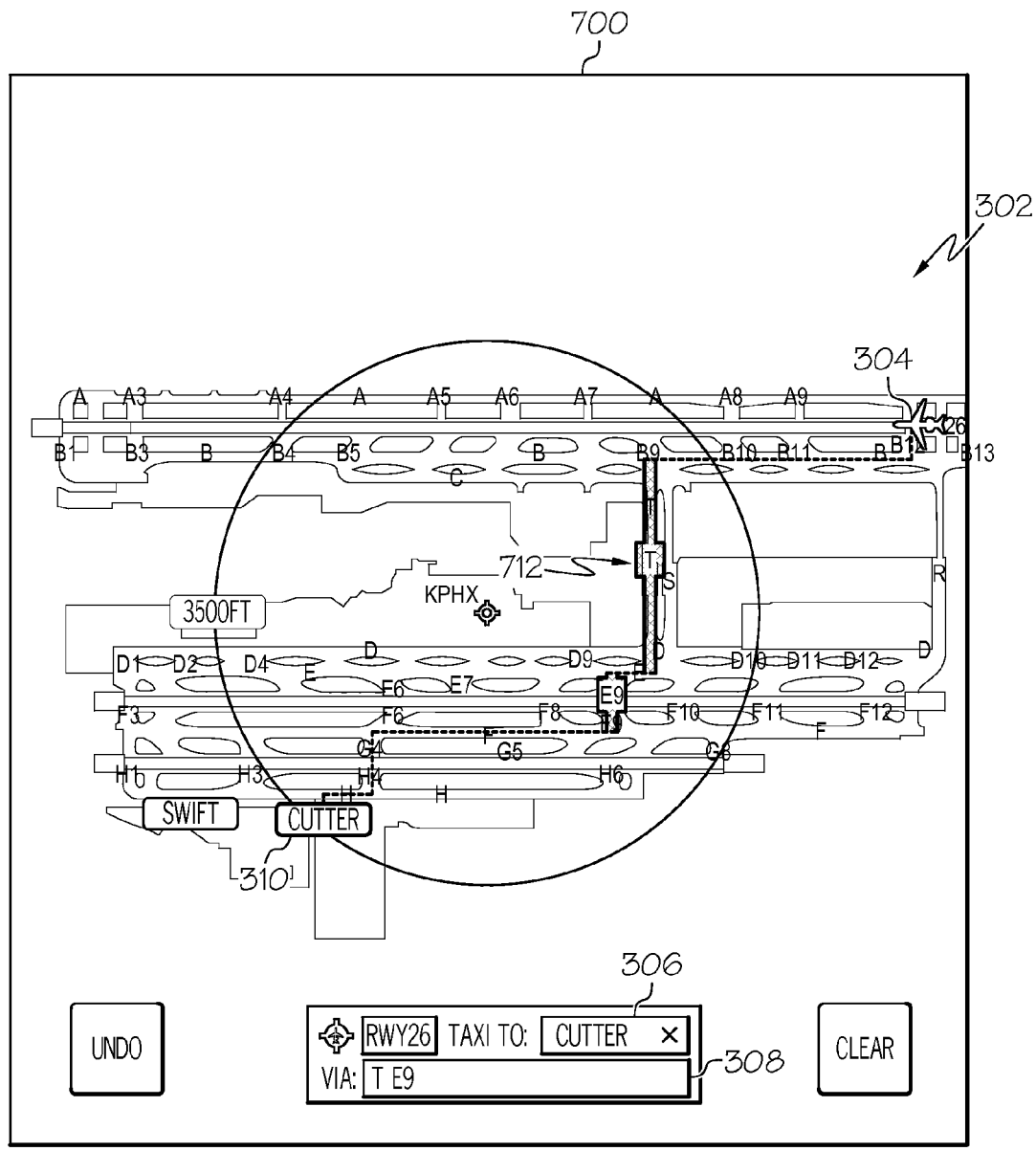

It should be noted that the taxi clearance display process 200 also allows the pilot to quickly and easily modify the displayed taxi clearance in response to receiving a modified taxi clearance or a change to the taxi clearance from an air traffic controller. For example, as depicted in FIGS. 6-7, a modified taxi instruction that includes taxiway T may be received from the air traffic controller. In response to a modified taxi clearance instruction, the pilot may manipulate the user input device 104 to select the text box 308 and input 'T' as a constraining taxi path, which results in the display device 102 being automatically updated from airport map display 500 to airport map display 600 to display a new constrained taxi clearance 612. In this regard, in some embodiments, providing user input after selecting the text box 308 may cause the processing system 106 to automatically discard previously input constraining taxi paths. Additionally, either based on memory or the modified taxi clearance instructions, the pilot may manipulate the user input device 104 to input 'E9' as a second constraining taxi path, which results in the display device 102 being automatically updated from airport map display 600 to airport map display 700 to display an updated constrained taxi clearance 712. Thus, the number of manual inputs required by the pilot to modify the displayed taxi clearance may also be reduced accordingly.

Figure 8:
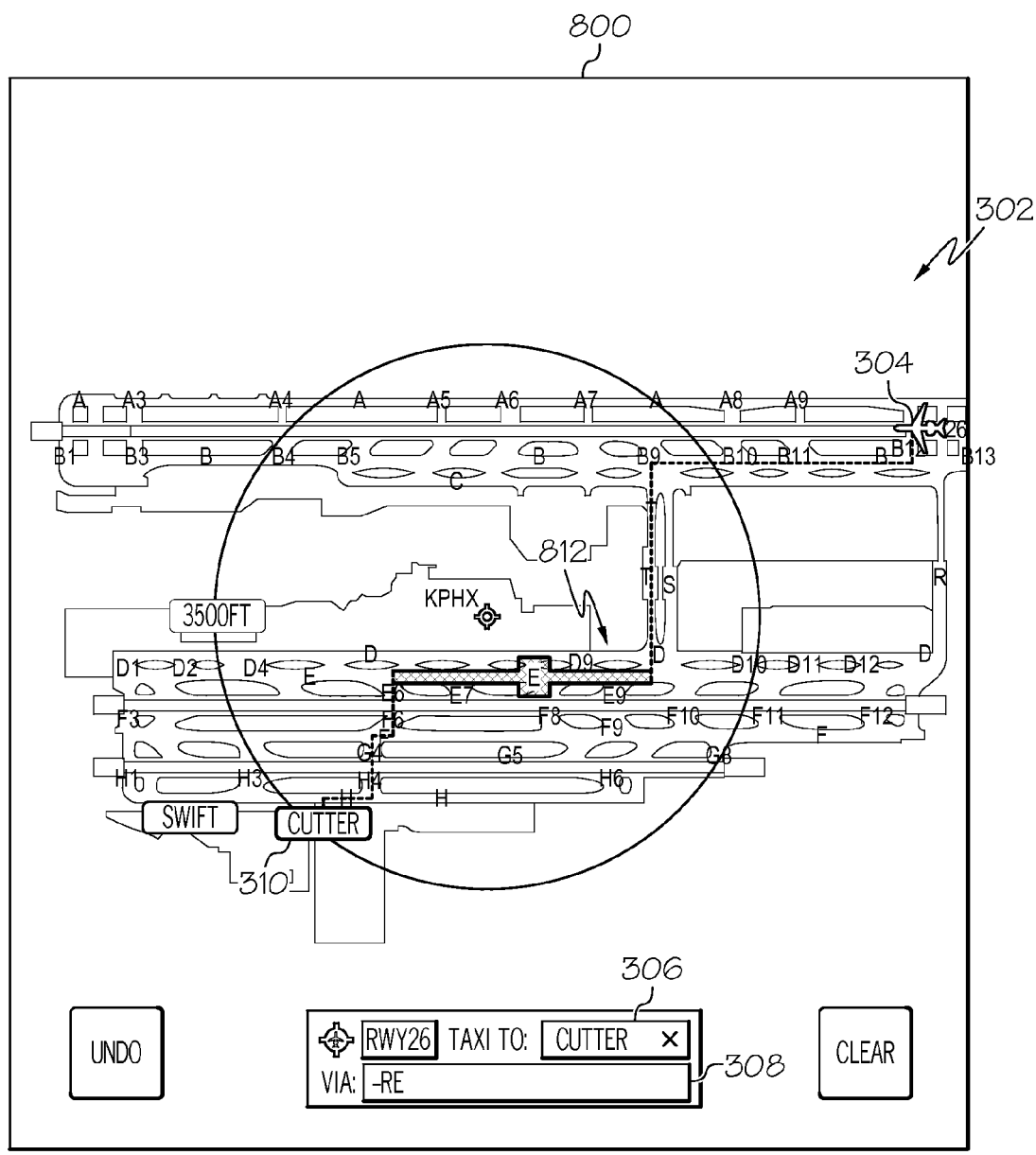
FIG. 8 depicts another navigational map display suitable for display on a display device onboard the aircraft in the system of FIG. 1 in accordance with one or more embodiments of the taxi clearance display process of FIG. 2.

As depicted in FIG. 8, in exemplary embodiments, the taxi clearance display process 200 may implement shorthand notations identifying turn instructions, hold instructions, cross instructions, or the like that are part of the received taxi clearance. For example, if the taxi clearance received from the air traffic controller includes the instruction "right on E" and the initially displayed taxi clearance depicts a left turn on E (e.g., towards the CUTTER FBO via F10, F11 or F12), the pilot may manipulate the user input device 104 to input the shorthand directional notation for a turn right instruction (e.g., -R) followed by 'E' as a directionally constraining taxi path, resulting in the updated airport map display 800 of FIG. 8 that includes a directionally constrained taxi clearance 812 displayed thereon. In this regard, the hyphen symbol ('-') may be used to indicate special usage of an alphanumeric character so that it is not confused with a taxi path. For example, in addition to the turn right shorthand (-R), directional usages turn left (-L), turn (or head) north (-N), turn (or head) south (-S), turn (or head) west (-W), and turn (or head) east (-E) may also be supported. Additionally, the hyphen symbol may be used to denote an abbreviation for a particular location that is not a taxiway or runway (e.g., -CUT for CUTTER).

In addition to the "-R" shorthand notation depicted in FIG. 8, in practice, a library of shorthand notations may be implemented using the characters commonly available on flight deck keyboards or other user input device 104 in the cockpit of an aircraft 120. For example, in one embodiment, the forward slash symbol ('/') may be used to denote a hold short instruction associated with the next input taxi path following the symbol (e.g., /E for hold short of taxiway E), a pair of dash symbols ('--') may be used to denote a cross instruction associated with next input taxi path, a period symbol ('.') may be used to denote an at or on instruction associated with the next input taxi path, and a pair of period symbols ('..') may be used to denote a final surface destination. In exemplary embodiments, a graphical representation of the instruction denoted by the short hand instruction may also be presented on the display device 102 relative to its associated taxi path to visually present the instruction to the user in conjunction with the taxi clearance. For example, a graphical indication of a hold short instruction may be displayed on or overlying the taxi route where the taxi route intersects the taxi path associated with the hold short instruction.

In addition to the shorthand notations, in some embodiments, the subject matter described herein may be configured to support spaceless entry of constraining taxi paths. For example, referring to FIG. 5, input "SE9" may be discerned as taxiway S followed by taxiway E9 based on there being no taxi paths or other locations identified by the letter 'S' followed by the letter 'E.' In situations where there is an ambiguity, the user may be prompted to resolve the ambiguity, or default rules may be applied to automatically select or identify an optimal manner of resolving the ambiguity. For example, if an airport has three taxiways 'A,' 'B,' and 'AB,' taxiway 'AB' may be automatically selected as the intended input when the user inputs "AB" based on the expectation that the user would be more likely than not to input a separator between successive taxiways.

In exemplary embodiments, the enter key is utilized as a separator between successive taxiways, along with the space key being recognized as a separator, however, the subject matter described herein is not limited to the particular key(s) or character(s) being utilized to separate constraining taxi paths. Additionally, character combinations that are unlikely to be used for taxi paths may be utilized as placeholders within the input taxi clearance as desired (e.g., '00' may be used where the user could not enter a constraining taxi path fast enough or otherwise wants to remember or revisit some aspect at this location in the taxi clearance). In one exemplary embodiment, the clear key (or a variant thereof) is utilized to delete the entire input taxi clearance, while the delete key (or variant thereof) is utilized to delete one constraining taxi path at a time.

For the sake of brevity, conventional techniques related to graphics and image processing, taxiing, aircraft controls, human factors, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of displaying a taxi clearance for an aircraft, the method comprising:
   displaying, on a display device associated with the aircraft, an initial taxi route between an initial location for the taxi clearance and a destination location for the taxi clearance using a first visually distinguishable characteristic;
   receiving user input indicative of a constraining taxi path of a plurality of taxi paths at an airport; and
   in response to receiving the user input indicative of the constraining taxi path:
      automatically determining a first taxi portion between the initial location and the constraining taxi path;
      automatically determining a second taxi portion between the constraining taxi path and the destination location; and
      automatically displaying, on the display device, an updated taxi route in lieu of the initial taxi route, wherein:
         the updated taxi route comprises the first taxi portion, the second taxi portion, and the constraining taxi path between the first taxi portion and the second taxi portion;
         the first taxi portion and the second taxi portion are displayed using the first visually distinguishable characteristic; and
         the constraining taxi path is displayed using a second visually distinguishable characteristic different from the first visually distinguishable characteristic.

2. The method of claim 1, wherein:
   the first taxi portion comprises interconnected portions of a first subset of one or more taxi paths of the plurality of taxi paths that connect the initial location to the constraining taxi path;
   the second taxi portion comprises interconnected portions of a second subset of one or more taxi paths of the plurality of taxi paths that connect the constraining taxi path to the destination location;
   an interconnecting portion of the constraining taxi path between the first taxi portion and the second taxi portion is rendered using the second visually distinguishable characteristic; and
   the interconnected portions of the first subset and the interconnected portions of the second subset are rendered using the first visually distinguishable characteristic.

3. The method of claim 1, wherein:
   automatically determining the first taxi portion comprises automatically determining a first optimal taxi route between the initial location and the constraining taxi path; and
   automatically determining the second taxi portion comprises automatically determining a second optimal taxi route between the constraining taxi path and the destination location.

4. The method of claim 3, further comprising:
   determining an initial optimal taxi route between the initial location and the destination location, the initial taxi route comprising the initial optimal taxi route, wherein displaying the initial route comprises displaying the initial optimal taxi route on the display device prior to receiving the user input indicative of the constraining taxi path, wherein displaying the updated taxi route comprises updating the display device to display the updated taxi route in lieu of the initial optimal taxi route.

5. The method of claim 4, further comprising receiving an initial user input indicative of the destination location prior to receiving the user input indicative of the constraining taxi path, wherein:
   determining the initial optimal taxi route comprises automatically determining the initial optimal taxi route in response to the initial user input; and
   displaying the initial optimal taxi route comprises automatically displaying the initial optimal taxi route on the display device in response to determining the initial optimal taxi route.

6. The method of claim 1, further comprising:
   receiving a second user input indicative of a second constraining taxi path of the plurality of taxi paths at the airport; and
   in response to receiving the user input, automatically displaying a second updated taxi route between the initial location for the aircraft and the destination location for the aircraft by:
      determining a third taxi portion between the constraining taxi path and the second constraining taxi path;
      determining a fourth taxi portion between the second constraining taxi path and the destination location; and
      displaying the second updated taxi route comprising the first taxi portion, the third taxi portion, the constraining taxi path between the first taxi portion and the third taxi portion, the fourth taxi portion, and the second constraining taxi path between the third taxi portion and the fourth taxi portion, wherein:
         the first taxi portion, the third taxi portion, and the fourth taxi portion are displayed using the first visually distinguishable characteristic; and
         the constraining taxi path and the second constraining taxi path are displayed using the second visually distinguishable characteristic.

7. The method of claim 6, wherein:
   determining the first taxi portion comprises automatically determining a first optimal taxi route between the initial location and the constraining taxi path;
   determining the second taxi portion comprises automatically determining a second optimal taxi route between the constraining taxi path and the destination location;
   determining the third taxi portion comprises automatically determining a third optimal taxi route between the constraining taxi path and the second constraining taxi path; and
   determining the fourth taxi portion comprises automatically determining a fourth optimal taxi route between the second constraining taxi path and the destination location.

8. The method of claim 7, further comprising:
   receiving an initial user input indicative of the destination location;
   determining an initial optimal taxi route between the initial location and the destination location, the initial taxi route comprising the initial optimal taxi route, wherein:
      displaying the initial route comprises displaying the initial optimal taxi route on the display device prior to receiving the user input indicative of the constraining taxi path, wherein:
         automatically displaying the updated taxi route comprises automatically displaying the updated taxi route on the display device after receiving the user input indicative of the constraining taxi path and prior to receiving the second user input indicative of the second constraining taxi path; and
         displaying the second updated taxi route comprises automatically displaying the second updated taxi route on the display device after receiving the second user input indicative of the second constraining taxi path.

9. The method of claim 8, wherein:
   displaying the initial optimal taxi route comprises rendering the initial optimal taxi route on the display device with the first visually distinguishable characteristic;
   automatically displaying the updated taxi route comprises:
      rendering the constraining taxi path on the display device with the second visually distinguishable characteristic different from the first visually distinguishable characteristic; and
      rendering the first taxi portion and the second taxi portion on the display device with the first visually distinguishable characteristic; and
   automatically displaying the second updated taxi route comprises:
      rendering the constraining taxi path and the second constraining taxi path on the display device with the second visually distinguishable characteristic; and
      rendering the first taxi portion, the third taxi portion and the fourth taxi portion with the first visually distinguishable characteristic.

10. A computer-readable medium having instructions stored thereon executable by a processing system to perform the method of claim 1, wherein the processing system is coupled to the display device onboard the aircraft and a user input device onboard the aircraft to receive the user input via the user input device.

11. A method of displaying a taxi clearance for an aircraft from an initial location of the aircraft to a destination location at an airport, the airport comprising a plurality of taxi paths, the method comprising:
   displaying, on a display device onboard the aircraft, an initial taxi route between the initial location and the destination location using a first visually distinguishable characteristic;
   receiving user input indicative of a constraining taxi path of the plurality of taxi paths; and
   in response to receiving the user input, displaying an updated taxi route between the initial location and the destination location in lieu of the initial taxi route by:
      determining a first taxi portion from the initial location to the constraining taxi path;
      determining a second taxi portion from the constraining taxi path to the destination location; and
      displaying, on the display device, the updated taxi route comprising the first taxi portion, the second taxi portion, and the constraining taxi path between the first taxi portion and the second taxi portion, wherein:
         the first taxi portion and the second taxi portion are displayed using the first visually distinguishable characteristic; and
         the constraining taxi path is displayed using a second visually distinguishable characteristic different from the first visually distinguishable characteristic.

12. The method of claim 11, wherein:
displaying the initial taxi route comprises rendering the initial taxi route on the display device with the first visually distinguishable characteristic;
displaying the updated taxi route comprises:
rendering the constraining taxi path on the display device with the second visually distinguishable characteristic different from the first visually distinguishable characteristic; and
rendering the first taxi portion and the second taxi portion on the display device with the first visually distinguishable characteristic.

13. The method of claim 11, further comprising determining the initial taxi route as a first optimal sequence of one or more taxi paths of the plurality of taxi paths for connecting the initial location to the destination location, wherein:
determining the first taxi portion comprises determining a second optimal sequence of one or more taxi paths of the plurality of taxi paths for connecting the initial location to the constraining taxi path;
determining the second taxi portion comprises determining a third optimal sequence of one or more taxi paths of the plurality of taxi paths for connecting the initial location to the constraining taxi path; and
the updated taxi route comprises the second optimal sequence followed by the constraining taxi path followed by the third optimal sequence.

14. The method of claim 13, wherein:
displaying the initial taxi route comprises rendering the first optimal sequence on the display device with the first visually distinguishable characteristic;
displaying the updated taxi route comprises:
rendering the constraining taxi path on the display device with the second visually distinguishable characteristic different from the first visually distinguishable characteristic; and
rendering the second optimal sequence and the third optimal sequence on the display device with the first visually distinguishable characteristic.

15. An aircraft display system comprising:
a user input device to receive an input indicative of a constraining taxi path of a plurality of taxi paths at an airport;
a display device to display a map of the airport, the map including the plurality of taxi paths and visually indicating an initial taxi route between an initial location for a taxi clearance and a destination location for a taxi clearance using a first visually distinguishable characteristic; and
a processing system coupled to the user input device and the display device to determine a first taxi portion between the initial location for the taxi clearance and the constraining taxi path, determine a second taxi portion between the constraining taxi path and the destination location for the taxi clearance, and update the map to visually indicate the first taxi portion, the second taxi portion, and the constraining taxi path between the first taxi portion and the second taxi portion, wherein:
the first taxi portion and the second taxi portion are visually indicated using the first visually distinguishable characteristic; and
the constraining taxi path is visually indicated using a second visually distinguishable characteristic different from the first visually distinguishable characteristic.

16. The aircraft display system of claim 15, wherein:
the first taxi portion comprises a first optimal taxi route from the initial location to the constraining taxi path determined by the processing system; and
the second taxi portion comprises a second optimal taxi route from the constraining taxi path to the destination location determined by the processing system.

17. The aircraft display system of claim 15, wherein:
in response to receiving a second user input indicative of a second constraining taxi path of the plurality of taxi paths at the airport via the user input device, the processing system determines a third taxi portion between the constraining taxi path and the second constraining taxi path, determining a fourth taxi portion between the second constraining taxi path and the destination location, and updates the map to visually indicate the first taxi portion, the third taxi portion, the fourth taxi portion, the constraining taxi path between the first taxi portion and the third taxi portion, and the second constraining taxi path between the third taxi portion and the fourth taxi portion;
the first taxi portion, the third taxi portion, and the fourth taxi portion are displayed with the first visually distinguishable characteristic; and
the constraining taxi path and the second constraining taxi path are displayed with the second visually distinguishable characteristic different from the first visually distinguishable characteristic.

18. The method of claim 6, wherein:
the initial taxi route comprises an initial optimal taxi route between the initial location and the destination location;
the first taxi portion comprises a first optimal taxi route between the initial location and the constraining taxi path;
the second taxi portion comprises a second optimal taxi route between the constraining taxi path and the destination location;
the third taxi portion comprises a third optimal taxi route between the constraining taxi path and the second constraining taxi path;
the fourth taxi portion comprises a fourth optimal taxi route between the second constraining taxi path and the destination location.

19. The aircraft display system of claim 16, wherein:
the initial taxi route comprises a first optimal sequence of one or more taxi paths of the plurality of taxi paths for connecting the initial location to the destination location, wherein:
the first taxi portion comprises a second optimal sequence of one or more taxi paths of the plurality of taxi paths for connecting the initial location to the constraining taxi path; and
the second taxi portion comprises a third optimal sequence of one or more taxi paths of the plurality of taxi paths for connecting the initial location to the constraining taxi path.

* * * * *